US008939178B1

(12) United States Patent
Lindner et al.

(10) Patent No.: US 8,939,178 B1
(45) Date of Patent: Jan. 27, 2015

(54) VARIABLE-APERTURE RECIPROCATING REED VALVE

(71) Applicant: The United States of America as Represented by the Administrator of the National Aeronautics and Space Administration, Washington, DC (US)

(72) Inventors: Jeffrey L. Lindner, Madison, AL (US); W. Neill Myers, Huntsville, AL (US); Anthony R. Kelley, Huntsville, AL (US); Hong Q. Yang, Huntville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/258,796

(22) Filed: Apr. 22, 2014

(51) Int. Cl.
*G05D 7/01* (2006.01)
*F16K 15/16* (2006.01)

(52) U.S. Cl.
CPC ..................................... *F16K 15/16* (2013.01)
USPC ................ 138/46; 138/45; 137/521; 137/855

(58) Field of Classification Search
USPC .............. 138/46; 137/521, 855, 856; 417/569
See application file for complete search history.

(56) References Cited

U.S. PATENT DOCUMENTS

| 2,899,981 | A | * | 8/1959 | Binks | 138/46 |
|---|---|---|---|---|---|
| 3,057,373 | A | * | 10/1962 | Bragg | 137/521 |
| 3,581,773 | A | * | 6/1971 | Warren | 138/26 |
| 4,230,149 | A | * | 10/1980 | Worthen et al. | 137/517 |
| 4,236,875 | A | | 12/1980 | Widdowson | |
| 4,377,968 | A | * | 3/1983 | Gerry | 454/213 |
| 4,642,037 | A | * | 2/1987 | Fritchman | 417/571 |
| 4,989,456 | A | * | 2/1991 | Stupecky | 73/863.53 |
| 5,421,368 | A | | 6/1995 | Maalouf et al. | |
| 5,655,898 | A | * | 8/1997 | Hashimoto et al. | 417/569 |
| 6,227,825 | B1 | * | 5/2001 | Vay | 417/569 |
| 6,615,774 | B2 | | 9/2003 | Heulitt | |
| 7,491,037 | B2 | | 2/2009 | Edwards | |
| 8,113,832 | B2 | | 2/2012 | Snyder et al. | |
| 2003/0072660 | A1 | * | 4/2003 | Lawson | 417/569 |
| 2011/0229348 | A1 | | 9/2011 | Honda | |
| 2011/0291037 | A1 | | 12/2011 | Hasunuma | |
| 2012/0240891 | A1 | | 9/2012 | Benham | |

* cited by examiner

*Primary Examiner* — Patrick F Brinson
(74) *Attorney, Agent, or Firm* — Peter J. Van Bergen; James J. McGroary

(57) ABSTRACT

A variable-aperture reciprocating reed valve includes a valve body defining a through hole region having a contoured-profile portion. A semi-rigid plate is affixed on one side thereof to the valve body to define a cantilever extending across the through hole region. At least one free edge of the cantilever opposes the contoured-profile portion of the through hole region in a non-contact relationship.

18 Claims, 3 Drawing Sheets

VARIABLE-APERTURE RECIPROCATING REED VALVE

ORIGIN OF THE INVENTION

The invention described herein was made in the performance of work under NASA contracts and by an employee of the United States Government and is subject to the provisions of Section 20135(b) of the National Aeronautics and Space Act, Public Law 111-314, §3 (124 Stat. 3330, 51 U.S.C. Chapter 201) and 35 U.S.C. §202, and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

This invention relates to reciprocating valves. More specifically, the invention is reciprocating reed valve with a variable aperture.

2. Description of the Related Art

A reciprocating valve is used to control back-and-forth fluid flow between two chambers, conduits, etc. When the delta pressure between two such chambers is variable, it is desirable for a reciprocating valve to automatically adjust to the varying pressure in order to maintain a desired flow schedule and avoid over-restriction of a fluid flow.

SUMMARY OF THE INVENTION

Accordingly, it is an object of the present invention to provide a reciprocating valve that automatically adjusts to varying pressure differentials across the valve.

Another object of the present invention is to provide a reciprocating reed valve whose flow aperture changes with varying pressure differentials to achieve a desired flow schedule.

Other objects and advantages of the present invention will become more obvious hereinafter in the specification and drawings.

In accordance with the present invention, a variable-aperture reciprocating reed valve includes a valve body defining a through hole region with at least a portion of a surface of the through hole region defining a contoured profile. A semi-rigid plate is affixed on one side thereof to the valve body to define a cantilever extending across the through hole region wherein at least one free edge of the cantilever opposes the contoured-profile portion of the through hole region in a non-contact relationship.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
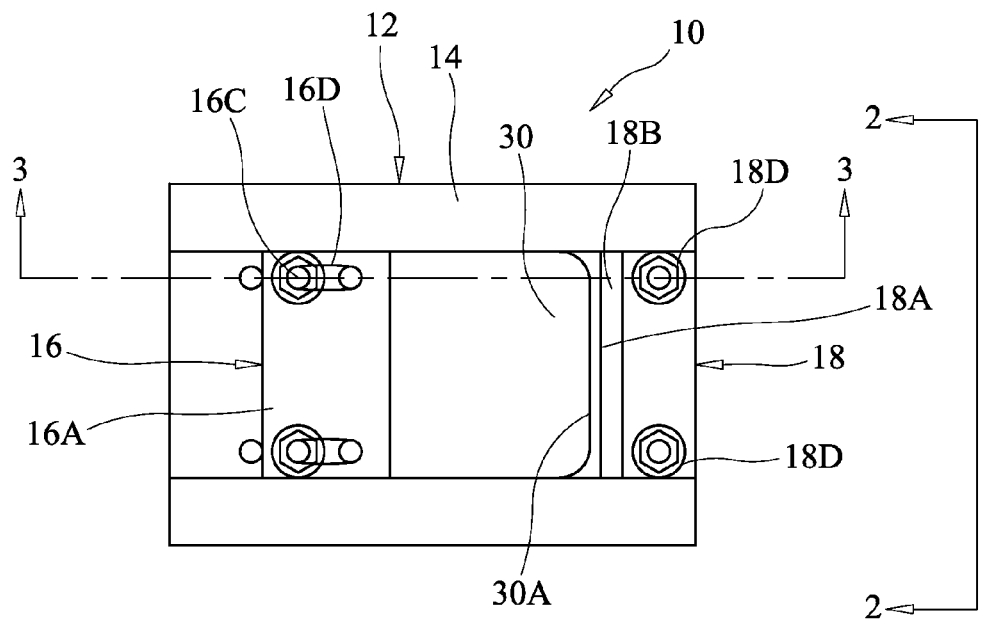
FIG. 1 is a plan view of a variable-aperture reciprocating reed valve in accordance with an embodiment of the present invention.
Figure 2:
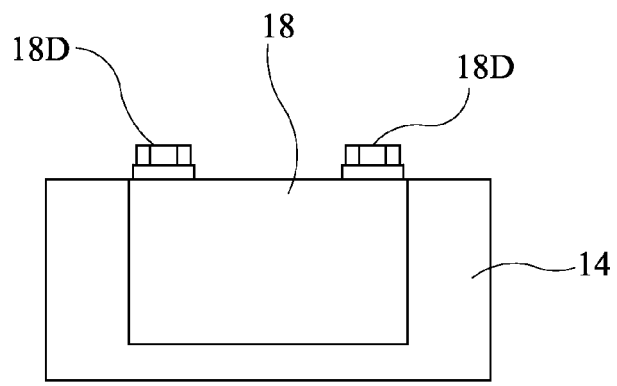
FIG. 2 is an end view of the reed valve taken along line 2-2 in FIG. 1.

Referring now to the drawings, simultaneous reference will be made to FIGS. 1-3 where plan, end, and cross-sectional views, respectively, are shown for a variable-aperture reciprocating reed valve 10 in accordance with an embodiment of the present invention. Reed valve 10 can be used as a fluid flow (e.g., gas or liquid) control valve between two conduits/chambers. Reed valve 10 automatically adjusts its flow aperture based on the pressure differential across the valve. The flow aperture variations are readily incorporated into reed valve 10 to accommodate a particular application's requirements.

Reed valve 10 includes a valve body that can be constructed as an assembly 12 to provide the greatest design flexibility. In the illustrated embodiment, valve body assembly 12 includes a U-shaped channel 14, a clamping assembly 16, and a flow schedule insert 18. A hole 14A is formed in the base of U-shaped channel 14. Clamping assembly 16 is located on one side of hole 14A and is attached/affixed to U-shaped channel 14. Flow schedule insert 18 is located on the opposing side of hole 14A and is attached/affixed to U-shaped channel 14 such that insert 18 opposes clamping assembly 16. As a result, the combination of U-shaped channel 14 (with hole 14A), clamping assembly 16, and insert 18 define a through hole region 20 (FIG. 3) that extends through valve body assembly 12.

Some or all of the surface of flow schedule insert 18 defines a contoured profile that helps define a variable aperture for the reed valve 10. In the illustrated embodiment, the contoured surface profile of insert 18 includes a linear apex 18A, a concave surface 18B extending away from linear apex 18A in one direction of through hole region 20, and a concave surface 18C extending away from linear apex 18A in the opposite direction of through hole region 20. Insert 18 is affixed to U-shaped channel 14 by screws 18D.

Reed valve 10 also includes a semi-rigid plate or "reed" 30 that extends across through hole region 20. Briefly, plate 30 is fixed to valve body assembly 12 by clamping assembly 16 to define a cantilever and such that the plate/cantilever's outbound/free edge 30A is adjacent, but spaced apart from, linear apex 18A when the pressure differential on either side of plate 30 is zero, i.e., plate 30 is in a static pressure environment. More specifically, one end of plate 30 is captured between clamping blocks 16A and 16B of clamping assembly 16. Screws 16C are used to clamp blocks 16A/16B to plate 30 and to affix blocks 16A/16B to U-shaped channel 14 as shown in FIG. 3. Blocks 16A/16B can be slotted at 16D to adjust the spacing between free edge 30A and linear apex 18A as well as to adjust the stiffness of the cantilevered portion of plate 30 as more or less of the cantilevered portion of plate 30 extends from clamping assembly 16. Additionally, flow schedule insert 18 can incorporate slots 18E (FIG. 3) to adjust the spacing between free edge 30A and linear apex 18A.

Figure 3:
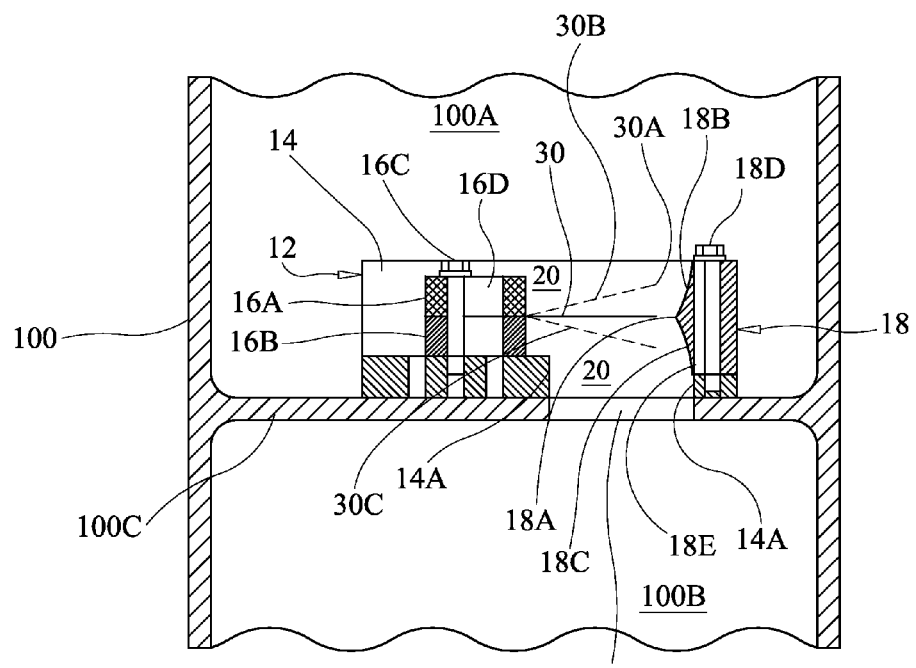
FIG. 3 is a cross-sectional view of the reed valve taken along line 3-3 in FIG. 1.

In operation and with reference to FIG. 3, reed valve 10 is positioned in (for example) a conduit 100 having flow regions 100A and 100B separated by a barrier 100C having a hole 100D formed therein. Reed valve 10 is positioned over hole 100D such that through hole region 20 is aligned with hole 100D. When pressure in region 100B is greater than in region 100A, plate 30 deflects into region 100A as shown by dashed line 30B. Conversely, when pressure in region 100A is greater than in region 100B, plate 30 deflects into region 100B as shown by dashed line 30C. The contoured surfaces 18B and 18C of insert 18 vary the flow aperture of reed valve 10. In the illustrated embodiment, the concave nature of surfaces 18B and 18C will cause the flow aperture to geometrically increase (i.e., based on the geometric shape used for surfaces 18B and 18C) with increased pressure differentials between regions 100A and 100B thereby increasing flow and reducing flow restriction as the pressure differential increases.

Figure 4:
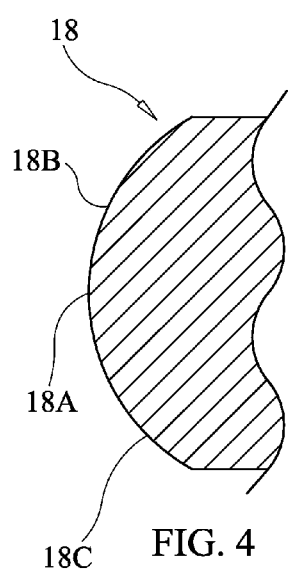
FIG. 4 is an isolated cross-sectional view of the portion of the valve body's flow schedule insert defining convex contour profiles in accordance with another embodiment of the present invention.
Figure 5:
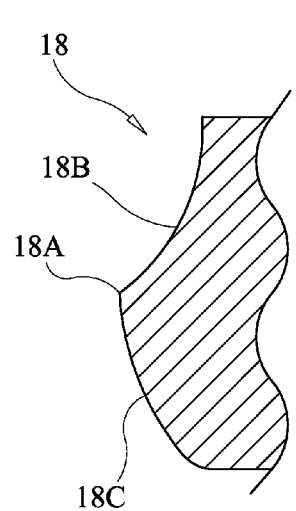
FIG. 5 is an isolated cross-sectional view of the portion of the valve body's flow schedule insert defining concave and convex contour profiles in accordance with another embodiment of the present invention.
Figure 6:
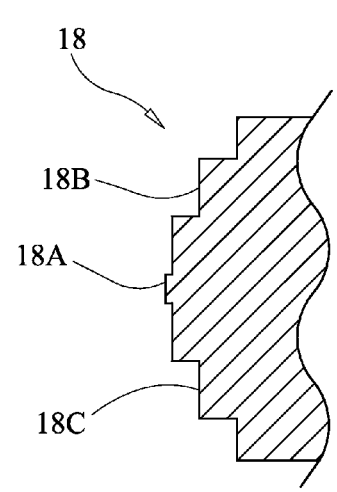
FIG. 6 is an isolated cross-sectional view of the portion of the valve body's flow schedule insert defining irregularly-shaped contour profiles in accordance with another embodiment of the present invention.

Contoured surfaces 18B and 18C can be identical (as shown in FIG. 3) or different without departing from the scope of the present invention. Further, the contour profiles presented by surfaces 18B and 18C are not limited to concave profiles. FIGS. 4-6 illustrate (in isolation) cross-sectional views of other exemplary flow schedule insert embodiments. In FIG. 4, each of surfaces 18B and 18C presents a convex profile extending in opposite directions with respect to linear apex 18A. In FIG. 5, surface 18B presents a concave profile while surface 18C presents a convex profile. In FIG. 6, surfaces 18B and 18C present stepped profiles extending away from linear apex 18A. Accordingly, it is to be understood that each of the contoured profiles presented by surfaces 18B and 18C can be shaped to satisfy the requirements of a particular application.

Figure 7:
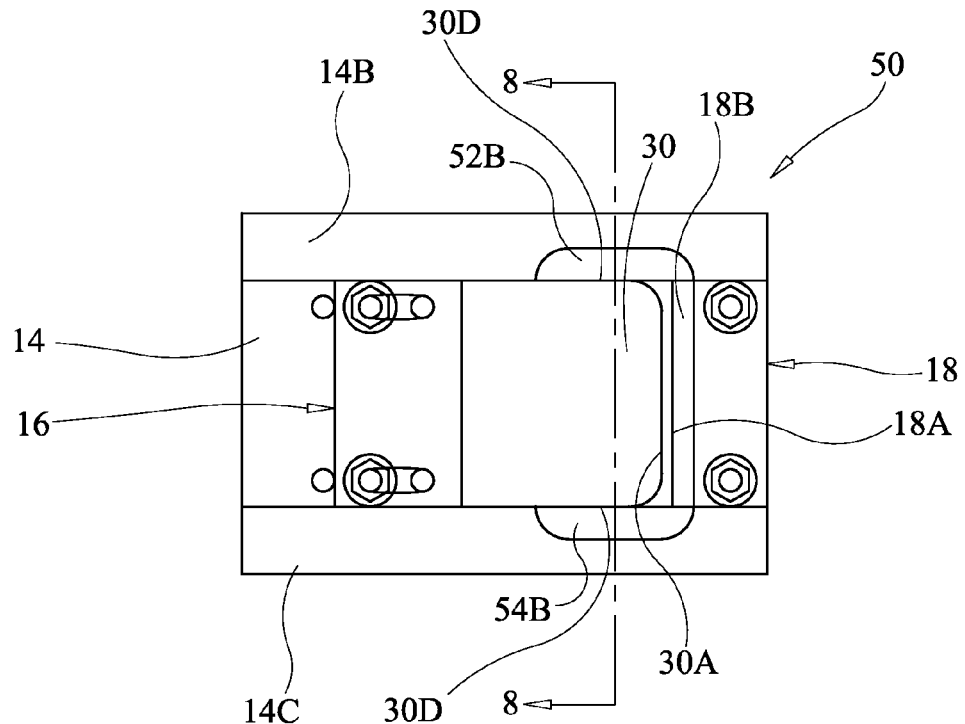
FIG. 7 is a plan view of a variable-aperture reciprocating valve in accordance with another embodiment of the present invention.
Figure 8:
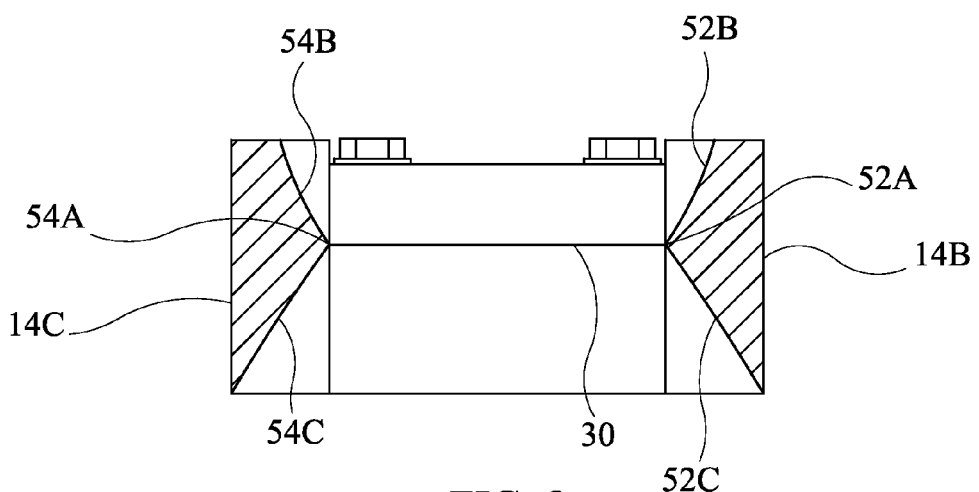
FIG. 8 is a cross-sectional view of the reed valve taken along line 8-8 in FIG. 7.

Although the previously-described embodiments assume that a contoured surface profile will only be provided adjacent free edge 30A of plate 30, the present invention is not so limited. For example, a variable-aperture reciprocating reed valve 50 illustrated in FIGS. 7 and 8 forms additional contoured surface profiles on opposing sides of plate 30. More specifically, flow schedule regions are formed in opposing sides 14B and 14C of U-shaped channel 14 adjacent opposing sides 30D/30E of plate 30. As best illustrated in FIG. 8, side 14B includes contoured surfaces 52B and 52C extending from a linear apex 52A, while side 14C includes contoured surfaces 54B and 54C extending from linear apex 54A. The inclusion of the additional contoured surface profiles adjacent plate 30 increases flow aperture variability. As in the previously-described embodiment, the shapes of surfaces 52B/52C/54B/54C can be other than as shown without departing from the scope of the present invention.

The advantages of the present invention are numerous. The variable-aperture reciprocating reed valve can be used to expand the performance envelope of current orifice dependent devices. Orifices are currently used to limit flow in a myriad of applications. Some examples include shock absorbers, air conditioning systems, gas accumulators, burst diaphragms, engine flow control, transient shock attenuators, exhaust flow management, pressure relief valves, flow limiting devices, variable flow/variable delta pressure response flow meters, linear delta pressure flow meters, expanded-operation range flow meters, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A variable-aperture reciprocating reed valve, comprising:
    a valve body defining a through hole region with at least a portion of a surface of said through hole region defining a contoured profile;
    a semi-rigid plate affixed on one side thereof to said valve body to define a cantilever extending across said through hole region wherein at least one free edge of said cantilever opposes said portion of said through hole region in a non-contact relationship; and
    said valve body comprising an assembly for adjusting at least one of said non-contact relationship and stiffness of said cantilever.

2. A variable-aperture reciprocating reed valve as in claim 1, wherein said portion comprises:
    an apex aligned with said at least one free edge when said plate is immersed in a static pressure environment;
    a first surface region extending away from said apex in a first direction; and
    a second surface region extending away from said apex in a second direction.

3. A variable-aperture reciprocating reed valve as in claim 2, wherein said first surface region and said second surface region are identically shaped.

4. A variable-aperture reciprocating reed valve, comprising:
    a valve body defining a through hole region with at least a portion of a surface of said through hole region defining a contoured profile;
    a semi-rigid plate affixed on one side thereof to said valve body to define a cantilever extending across said through hole region wherein at least one free edge of said cantilever opposes said portion of said through hole region in a non-contact relationship,
    wherein said portion includes an apex aligned with said at least one free edge when said plate is immersed in a static pressure environment, a first surface region extending away from said apex in a first direction, and a second surface region extending away from said apex in a second direction, wherein said first surface region and said second surface region are shaped differently.

5. A variable-aperture reciprocating reed valve, comprising:
    a valve body defining a through hole region with at least a portion of a surface of said through hole region defining a contoured profile;
    a semi-rigid plate affixed on one side thereof to said valve body to define a cantilever extending across said through hole region wherein at least one free edge of said cantilever opposes said portion of said through hole region in a non-contact relationship,
    wherein said portion includes an apex aligned with said at least one free edge when said plate is immersed in a static pressure environment, a first surface region extending away from said apex in a first direction, and a second surface region extending away from said apex in a second direction, wherein said first surface region and said second surface region are concave.

6. A variable-aperture reciprocating reed valve as in claim 2, wherein said first surface region and said second surface region are convex.

7. A variable-aperture reciprocating reed valve, comprising:
- a valve body defining a through hole region with at least a portion of a surface of said through hole region defining a contoured profile;
- a semi-rigid plate affixed on one side thereof to said valve body to define a cantilever extending across said through hole region wherein at least one free edge of said cantilever opposes said portion of said through hole region in a non-contact relationship,
- wherein said portion includes an apex aligned with said at least one free edge when said plate is immersed in a static pressure environment, a first surface region extending away from said apex in a first direction, and a second surface region extending away from said apex in a second direction, wherein said first surface region and said second surface region comprise irregularly shaped surface regions.

8. A variable-aperture reciprocating reed valve, comprising:
- a valve body assembly defining a through hole region, said valve body assembly having a plate mounting assembly positioned on one side of said through hole region, said through hole region having at least a portion of a surface thereof defining a contoured profile, said portion including a linear apex region; and
- a semi-rigid plate affixed on one side thereof to said plate mounting assembly to define a cantilever extending across said through hole region wherein at least one free edge of said cantilever opposes said linear apex region in a non-contact relationship, and wherein said plate mounting assembly comprises a clamping assembly for adjustable positioning of said plate wherein said non-contact relationship and stiffness of said cantilever are adjusted.

9. A variable-aperture reciprocating reed valve as in claim 8, wherein said portion comprises:
- a first surface region extending away from said linear apex region in a first direction; and
- a second surface region extending away from said linear apex region in a second direction.

10. A variable-aperture reciprocating reed valve as in claim 9, wherein said first surface region and said second surface region are identically shaped.

11. A variable-aperture reciprocating reed valve as in claim 9, wherein said first surface region and said second surface region are shaped differently.

12. A variable-aperture reciprocating reed valve as in claim 9, wherein said first surface region and said second surface region are concave.

13. A variable-aperture reciprocating reed valve as in claim 9, wherein said first surface region and said second surface region are convex.

14. A variable-aperture reciprocating reed valve as in claim 9, wherein said first surface region and said second surface region comprise irregularly shaped surface regions.

15. A variable-aperture reciprocating reed valve, comprising:
- a valve body assembly defining a through hole region, said valve body assembly having a clamping assembly positioned on one side of said through hole region, said through hole region having at least a portion of a surface thereof defining a contoured profile, said portion including a linear apex region, a first surface region extending away from said linear apex region in a first direction, and a second surface region extending away from said linear apex region in a second direction, wherein said first surface region and said second surface region are shaped differently; and
- a semi-rigid plate affixed by said clamping assembly to define a cantilever extending across said through hole region wherein at least one free edge of said cantilever is aligned with said linear apex region and is spaced apart therefrom when said plate is immersed in a static pressure environment.

16. A variable-aperture reciprocating reed valve, comprising:
- a valve body assembly defining a through hole region, said valve body assembly having a clamping assembly positioned on one side of said through hole region, said through hole region having at least a portion of a surface thereof defining a contoured profile, said portion including a linear apex region, a first surface region extending away from said linear apex region in a first direction, and a second surface region extending away from said linear apex region in a second direction, wherein said first surface region and said second surface region are concave; and
- a semi-rigid plate affixed by said clamping assembly to define a cantilever extending across said through hole region wherein at least one free edge of said cantilever is aligned with said linear apex region and is spaced apart therefrom when said plate is immersed in a static pressure environment.

17. A variable-aperture reciprocating reed valve, comprising:
- a valve body assembly defining a through hole region, said valve body assembly having a clamping assembly positioned on one side of said through hole region, said through hole region having at least a portion of a surface thereof defining a contoured profile, said portion including a linear apex region, a first surface region extending away from said linear apex region in a first direction, and a second surface region extending away from said linear apex region in a second direction, wherein said first surface region and said second surface region are convex; and
- a semi-rigid plate affixed by said clamping assembly to define a cantilever extending across said through hole region wherein at least one free edge of said cantilever is aligned with said linear apex region and is spaced apart therefrom when said plate is immersed in a static pressure environment.

18. A variable-aperture reciprocating reed valve, comprising:
- a valve body assembly defining a through hole region, said valve body assembly having a clamping assembly positioned on one side of said through hole region, said through hole region having at least a portion of a surface thereof defining a contoured profile, said portion including a linear apex region, a first surface region extending away from said linear apex region in a first direction, and a second surface region extending away from said linear apex region in a second direction, wherein said first surface region and said second surface region comprise irregularly shaped surface regions; and
- a semi-rigid plate affixed by said clamping assembly to define a cantilever extending across said through hole region wherein at least one free edge of said cantilever is aligned with said linear apex region and is spaced apart therefrom when said plate is immersed in a static pressure environment.

* * * * *